United States Patent [19]

Gaetani et al.

[11] 4,052,380

[45] Oct. 4, 1977

[54] TRISAZO DYES CONTAINING TWO DIFFERENT AMINONAPHTHOLSULPHONIC ACID COUPLER COMPONENTS

[75] Inventors: Ermanno Gaetani, Milan; Sandro Ponzini, Saronno (Varese), both of Italy

[73] Assignee: Aziende Colori Nazionali Affini ACNA, S.p.A., Milan, Italy

[21] Appl. No.: 588,400

[22] Filed: Apr. 11, 1975

Related U.S. Application Data

[63] Continuation of Ser. No. 414,832, Nov. 12, 1973, abandoned.

[30] Foreign Application Priority Data

Nov. 10, 1972 Italy .................................. 31513/72

[51] Int. Cl.² ............................................. C09B 35/04
[52] U.S. Cl. .................................... 260/169; 260/149; 260/159; 260/166
[58] Field of Search ............................... 260/169, 170

[56] References Cited

U.S. PATENT DOCUMENTS

| 2,021,917 | 11/1935 | Mendoza | 260/183 X |
| 2,203,196 | 6/1940 | Hanhart | 260/169 X |
| 2,286,714 | 6/1942 | Chechak | 260/169 X |

FOREIGN PATENT DOCUMENTS 754,562   8/1956   United Kingdom ................. 260/169

Primary Examiner—Charles F. Warren

[57] ABSTRACT

New direct dyes which can be diazotized on fibers and have the general formula

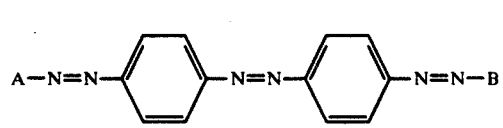

(1)

are disclosed. In the formula, A and B, which are different from each other, are amino-naphtholsulphonic acids. A process for making the new dyes by coupling one mole of a tetrazo derivative of 4,4-diamino-azobenzol with a mixture containing substantially one mole of the amino-naphtholsulphonic acid A and one mole of the different amino-naphtholsulphonic acid B, in an alkaline medium, is also enclosed.

3 Claims, No Drawings

TRISAZO DYES CONTAINING TWO DIFFERENT AMINONAPHTHOLSULPHONIC ACID COUPLER COMPONENTS

This is a continuation of application Ser. No. 414,832, filed Nov. 12, 1973 now abandoned.

THE PRIOR ART

German Pat. No. 74,593 discloses direct dyes for cotton obtained by coupling one mole of a tetrazo-derivative of 4, 4-diaminodiphenyl or a derivative thereof with two moles of amino-naphtholsulphonic acids which are the same or different.

Various commercial dyes prepared according to said German patent are known such as, for instance, the dyes which are listed in the Color Index under the general designations of Direct Blue 2 (C.I. 22,590); Direct Blue 48 (C.I. 22,565); and Direct Blue 85 (C.I. 22,520) etc.

However, the manufacture of those dyes requires very strict protective measures for safguarding the health of the persons involved in the preparation thereof.

THE PRESENT INVENTION

An object of this invention is to provide new direct dyes which are diazotizable on fibers and the preparation of which does not present particular health hazards for the operators who prepare them.

Another object is to provide a single-phase process for preparing such dyes.

These and other objects of the invention which will be apparent hereinafter are achieved by providing dyes of the general formula

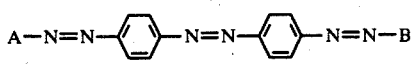

(I)

in which A and B are different amino-naphtholsulphonic acids such as 1-amino-8-naphthol - 3,6-disulphonic acid; 1-amino-8-naphthol-4,6-disulphonic acid; 2 - amino - 8 - naphthol-6-sulphonic acid; and 2 - amino - 5 - naphthol - 7 - sulphonic acid.

Surprisingly, we find that, in addition to the fact that the preparation of the dyes of general formula (I) does not involve particular risks for the operators who prepare the dyes, the dyes possess characteristics, such as, for instance, dyeing power, superior to the characteristics of the dyes derived from tetra-azodiphenyl.

Another advantage of the present invention is that the dyes of formula (I) can be prepared in a single phase, by coupling, in an alkaline medium, one mole of a tetrazo-derivative of 4,4-diamino - azobenzol with a mixture containing substantially one mole of the amino-naphthol-sulphonic acid A with one mole of the amino-naphtholsulphonic acid B, without having to pass through the formation of the coupled monoazo-compound, as is required when using the derivatives of 4,4'-diamino-diphenyl (see e.g., German Pat. No. 74,593).

The present dyes, prepared as described, are not mechanical mixtures of two symmetrical dyes, but are unitary asymmetrical dyes, as is proved by chromatographic tests on paper from aqueous eluant.

The dyes of general formula (I) are applied on cotton in general in a neutral aqueous bath or in a slightly alkaline bath containing added electrolytes, e.g., $Na_2SO_4$ crystals, NaCl, etc. The dyeing is usually conducted for one hour, at a temperature comprised between 50° C and 80° C for light shades, and at between 80° C and 90° C for medium and dark shades.

The dyeings thus obtained may then be developed on the fibers by conventional procedures, i.e., in a diazotization bath and subsequently in a development bath containing a suitable quantity of the developer and operating in the cold.

Various developers may be used, including chloroanilines, nitro-aniline, meta-toluylene-diamine, phenyl-methyl-pyrazolone, and beta-naphthol.

The dyes of this invention can also be used in a slightly acid bath for dyeing leather. The dyeings thus obtained may then be diazotized and developed as described hereinabove, to obtain more bath-ochromic shades.

The shades obtainable with the present dyes vary from blue to deep black.

The following examples are given to illustrate the invention and are not intended to be limiting. In the examples, the parts are by weight unless otherwise indicated.

EXAMPLE 1

Into a vessel fitted with a stirrer, were loaded 10.7 parts of diamino-azobenzol in the form of a 44.72% paste, and 70 parts of $H_2O$. The whole mass was kept under stirring over night. Thereupon, there were admixed 13 parts of HCl at 20° Be, maintaining the stirring for a further 30 minutes.

The mixture was cooled down with ice to 0° C and then diazotized by introducing into the mixture, over about 15 minutes, a solution containing 3.2 parts of a 100% $NaNO_2$ dissolved in 12 parts of water. This mass was then stirred for another 30 minutes up to the end of the diazotizing and the excess in nitrous acid was destroyed with solid sulphamic acid.

The tetrazo solution thus prepared was then added dropwise to a solution cooled down to 0° C containing in 280 parts of water:

9.1 parts of 1-amino-8-naphthol-3,6-disulphonic acid at 80%;

6.1 parts of 2-amino-8-naphthol-6-sulphonic acid at 90%; and 15.8 parts of Solvay soda.

At the end of the reaction the temperature was about 2° C at a pH equal to 8.8, which is brought up to 9 by the suitable addition of $Na_2CO_3$. The whole was then stirred for another 2-3 hours, whereafter the temperature was brought up to 20° C. The mixture was salted to a concentration of 20% with NaCl, then filtered and dried at 70° C. An excellent yield was attained in the form of a dark blue powder, a dye showing the following structural formula

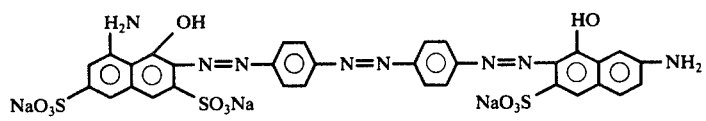

which dyes cotton in a dark blue shade of good all-round color-fastness.

EXAMPLE 2

A solution of the tetrazoderivative of 4,4'-diamino-azo-benzol, prepared as described in the preceding example, was fed dropwise to a solution consisting of:
- 280 parts of water;
- 18.3 parts of Solvay soda;
- 9.1 parts of 1-amino-8-naphthol-3,6-disulphonic acid at 79.2%;
- 6.1 parts of 2-amino-5-naphthol-7-sulphonic acid at 89.2%, cooled down to between 0° and 2° C by means of ice.

This reaction mass was then stirred for three hours, keeping said mass at 2° C, until the coupling was completed (pH = 9.1).

The whole was then heated to a temperature of 20° C, salted gradually to 20% with NaCl, and stirred for 2–3 hours, after which it was filtered and finally dried in an oven at 70° C.

A dye of the following structural formula:

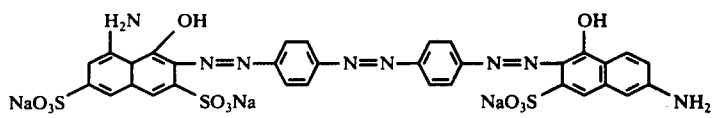

was obtained. It was a reddish blue powder which dyed cellulosic fabrics to a lovely reddish blue shade.

EXAMPLE 3

A solution of tetra-azoderivative of 4,4'-diamino-azobenzol, prepared as described in the preceding example, was added dropwise for 30 minutes to a solution consisting of:
- 280 parts of water;
- 18.3 parts of Solvay soda;
- 9.1 parts of 1-amino-8-naphthol-3,6-disulphonic acid at 79.2%;
- 3.76 parts of 2-amino-8-naphthol-6-sulphonic acid at 89.1%;
- 2.30 parts of 2-amino-5-naphthol-7-sulphonic acid at 89.2%, cooled down to between 0° and 2° C with ice.

The whole was heated to 20° C, then gradually salted with NaCl, to a concentration of 20%, stirred for 2–3 hours, filtered and finally dried in an oven at 70° C.

In the form of a dark blue powder, there was obtained a mixture of the two dyes of examples 1 and 2, in the ratio of 68:32 as would be obtained when mixing together mechanically, in the dry state, in the same proportion or ratio the dyes of examples 1 and 2.

This product dyes cotton in a marine blue shade of excellent characteristics, and which, diazotized and coupled on the fiber with metatoluylendiamine, yields a black dyeing of good characteristics.

The same shade may also be obtained in an application on leather.

What we claim is:

1. A direct dye diazotizable on fibers and having the formula:

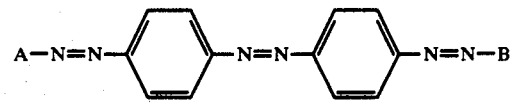

wherein A and B, different from each other, are aminonaphtholsulphonic acids selected from the group consisting of
  1-amino-8-naphthol-3,6-sulphonic acid; 1-amino-8-naphthol-4,
  6-disulphonic acid; 2-amino-8-naphthol-6-sulphonic acid and
  2-amino-5-naphthol-7-sulphonic acid.

2. A dye according to claim 1, characterized in having the formula:

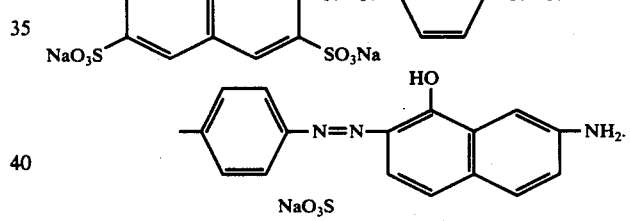

3. A dye according to Claim 1, characterized in having the formula:

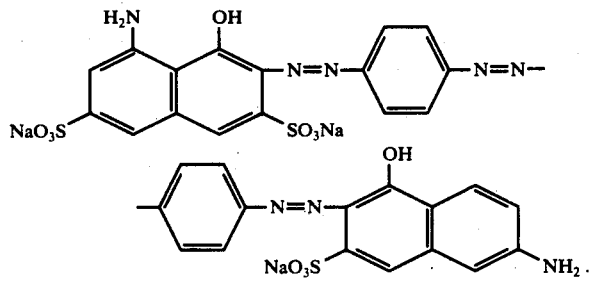

* * * * *